Patented Mar. 28, 1939

2,152,236

UNITED STATES PATENT OFFICE 2,152,236

INSECTICIDE

Charles H. Batchelder, Hamden, Conn., dedicated to the free use of the Public

No Drawing. Application August 28, 1936, Serial No. 98,344

3 Claims. (Cl. 167—34)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

An object of this invention is the preparation of nicotine tannate in a concentrated form which may be readily diluted with water for use in a spray.

Another object of this invention is the preparation of nicotine tannate in a form in which it can be used with hard water and with alkaline fungicides, such as Bordeaux mixture.

Another object of this invention is the preparation of nicotine tannate from a cheap grade of tannin.

Preparations of tannin fixed nicotine have been found very useful when employed as a combined stomach and contact poison insecticide against several types of insects. Because of its usefulness, this type of insecticide has been employed extensively for the protection of various kinds of crop and ornamental plants. One such preparation has been described by Headlee and Ginsburg in U. S. Patent No. 1,891,091.

The insecticidal effectiveness of tannin-fixed nicotine employed heretofore has depended largely upon the manner in which it has been prepared. To obtain satisfactory results it has been found necessary to employ tannin derived from Chinese nut-galls and to exercise great care in reacting the nicotine with the gallotannin. Nicotine and tannin are commercially available in aqueous solutions containing approximately 50 percent water, but if these preparations are mixed in this strength an immediate reaction occurs producing a mass of gumlike consistency which not only prevents proper mixing of the ingredients but makes impossible subsequent dispersion in water to dilution suitable for spraying. Hence the practice has been to combine nicotine with tannin in the presence of relatively large volumes of water. To prepare nicotine-tannate in concentrated form, it has been necessary to evaporate the dilute reaction mixture. This has not been found practicable from the standpoint of the quality of the finished product. Therefore, the ingredients have been combined only as required for immediate spray application.

The present invention consists of an improvement in the procedure for preparing nicotine tannate which not only permits: direct mixing and combining of nicotine and tannin without dilution to produce a concentrated stock paste, but in addition, results in a product which may be dispersed satisfactorily in hard water or with fungicides and then used as a spray without objectionable change in its physical properties.

The essential feature of this improvement is the use of a protective colloid to retard the rate of reaction of the tannin with the nicotine. This permits thorough mixing of the components of the preparation before the reaction has proceeded to the formation of a hard mass. Moreover, the protective colloid remains in the finished product intimately mixed with particles of nicotine tannate, greatly facilitating the dispersion of these particles in water as needed for the purposes of spraying.

The colloid so employed may be a third ingredient procured separately from the nicotine or the tannin and then mixed with either or both of these previous to combining them. This colloid must not be of a nature to react with either the nicotine or the tannin so as to lose its essential protective quality, or to prevent the combination of tannin with nicotine. Gum arabic is an example of a suitable substance for such a purpose and the following illustrations are given, with the understanding that the successful application of the principle is not limited to the proportions named here.

Seven pounds of gum arabic are warmed in 10 pounds of water until dissolved. With this solution 7 pounds of commercial tannin from Chinese nut-galls (consisting of 50 percent water, 40 percent tannin, and 10 percent non-tannins) are intimately mixed. Two pounds of commercial nicotine (approx. 50 percent) are next stirred in. A smooth creamy paste results which may be stored indefinitely without deterioration and which disperses freely and completely when stirred with water for dilution to a suitable spray strength.

As an alternative to the foregoing, it is possible to take advantage of the colloidal properties of the non-tannin components of natural vegetable tannin extracts when these are of suitable nature and especially when they are present in sufficiently large amounts in relation to the tannin content of the extract. The ratio of non-tannin to tannin should be at least 1, and preferably in the neighborhood of 2. As an illustration the following may be given:

Nineteen pounds of quebracho extract (approximately 17 percent tannin, 33 percent non-tannins, and 50 percent water) are mixed with one pound of commercial nicotine (50 percent). After mixing is complete the reaction may be hastened if desired by warming the mixture in a closed container, for instance, during about two hours at 80° to 90° C., or by ageing for a longer time at a lower temperature. Until the reaction is complete, there may be more or less loss of free nicotine by volatilization.

Although this protective colloid quality is present to varying degree in the non-tannins of all commercial tannin extracts, I have preferred quebracho extract both because of special suitability and low cost.

In practice, supplementary materials are usually incorporated in a spray formula to promote wetting and spreading of the spray on plant foliage. Such wetting and spreading agents are readily miscible in and compatible with these concentrated stock pastes, but their addition is not an essential part of this invention. It has been observed, however, that the presence of a high proportion of non-tannin material, as in the formula above using quebracho, assists very materially in the spreading and wetting of the spray on plant foliage such as sweet corn, cabbage and beet.

A small proportion of an organic solvent which is miscible with water, such as acetone or an alcohol, may be present in the concentrated mixture, modifying its viscosity and assisting in obtaining thorough mixing, but such an addition is not a necessary or an essential part of the formula.

I claim:

1. The process of making nicotine tannate in concentrated form consisting in reacting nicotine and tannin in an aqueous medium in the presence of a protective colloid.

2. The process of making nicotine tannate in concentrated form consisting in reacting nicotine and tannin in an aqueous medium in the presence of gum arabic.

3. The process of making nicotine tannate in concentrated form consisting in reacting nicotine and tannin in an aqueous medium in the presence of nontannin constituents of quebracho extract.

C. H. BATCHELDER.